United States Patent [19]

Branca

[11] Patent Number: 5,708,044

[45] Date of Patent: Jan. 13, 1998

[54] POLYETRAFLUOROETHYLENE COMPOSITIONS

[75] Inventor: Phillip A. Branca, Hockessin, Del.

[73] Assignee: W. L. Gore & Associates, Inc., Newark, Del.

[21] Appl. No.: 584,576

[22] Filed: Jan. 10, 1996

Related U.S. Application Data

[63] Continuation of Ser. No. 300,258, Sep. 2, 1994, abandoned.

[51] Int. Cl.$^6$ ............................................. C08J 9/24
[52] U.S. Cl. ................... 521/145; 521/54; 521/59; 521/134; 264/127; 264/154; 264/288.8
[58] Field of Search .................... 264/127, 154, 264/288.8; 521/54, 59, 134, 145

[56] References Cited

U.S. PATENT DOCUMENTS

| | | | |
|---|---|---|---|
| 4,096,227 | 6/1978 | Gore | 264/127 |
| 4,385,093 | 5/1983 | Hubis . | |
| 4,482,516 | 11/1984 | Bowman et al. . | |
| 4,598,011 | 7/1986 | Bowman . | |
| 4,882,113 | 11/1989 | Tu et al. | 264/127 |
| 4,891,407 | 1/1990 | Mitchell | 524/506 |
| 4,973,609 | 11/1990 | Browne . | |
| 5,102,921 | 4/1992 | Harada et al. . | |
| 5,110,527 | 5/1992 | Harada et al. . | |

FOREIGN PATENT DOCUMENTS

| | | |
|---|---|---|
| 0402901 | 12/1990 | European Pat. Off. . |
| 2262101 | 6/1993 | United Kingdom . |

OTHER PUBLICATIONS

Chemical Abstracts, vol. 119, No. 4, 26 Jul. 1993 –Columbus, Ohio, US; abstract No. 29650, JP–A–04 296 332 (Nitto Denko Corp.) 20 Oct. 1992.

*Primary Examiner*—John M. Cooney Jr.
*Attorney, Agent, or Firm*—Gary A. Samuels

[57] ABSTRACT

In the present invention a blend of resin composition and blending technique is optimized to provide a desired balance of node size and fibril length with the additional property of thermal stability in the resulting stretched material.

The stretched blend can be described as a polytetrafluoroethylene porous material having a microstructure of nodes interconnected by fibrils in which the material comprises a blend of two different polytetrafluoroethylenes, one polytetrafluoroethylene being a homopolymer of tetrafluoroethylene and the other polytetrafluoroethylene being a modified polymer of tetrafluoroethylene.

10 Claims, 2 Drawing Sheets

POLYETRAFLUOROETHYLENE COMPOSITIONS

This application is a continuation of application Ser. No. 08/300,258 filed Sep. 2, 1994, which is now abandoned.

FIELD OF THE INVENTION

This invention relates to porous polytetrafluoroethylene compositions and in particular to blends of such porous compositions.

BACKGROUND OF THE INVENTION

A wide variety of products are made by stretching polytetrafluoroethylene (PTFE) to form tapes, tubes, beads or films whose microstructure is comprised of a series of nodes interconnected by fibrils (see for example, U.S. Pat. No. 3,953,566). However, with some resins, which produce open structures, the high temperature structural stability of the expanded product is reduced, and this reduces or eliminates the ability to sinter or thermally-lock the product. The process of the present invention allows formation of large nodes and long fibrils which are uniform throughout the shaped article and are thermally stable, and therefore can be sintered or thermally-locked.

Some work has been carried out describing the stretching of blends of polytetrafluoroethylene resins. U.S. Pat. No. 4,973,609 (Browne), states that the blending of and stretching of commercially available polytetrafluoroethylene fine powders was carried out to produce a fibril and node structure and a higher tensile strength than previous porous fluoropolymer materials. The stated preferred method for blending was simply combining the fine powder PTFE components in the presence of lubricant and tumbling. U.S. Pat. No. 5,102,921 (Harada and Mano) describes a stretched blend of porous PTFE material in which the blend is of high molecular weight PTFE greater than 2,000,000 MW and a low molecular weight PTFE of less than 1,000,000 MW. Both Browne and Harada, et al. use homopolymer PTFE components or melt processible fluoropolymer components in their examples. There is no mention in them of use of modified PTFE homopolymers.

U.S. Pat. No. 4,482,516 describes a method of producing a porous PTFE article which is said to have large nodes and long fibrils. In this method, extrudate is densified after lubricant is removed and then is stretched to yield a porous article with high matrix tensile strength, long fibril length and large nodes. In this patent a coarseness factor is used to describe the microstructure. This factor is the ratio of bulk density and bubble point for a given stretched PTFE article, according to the equation:

$$\text{Coarseness Factor} = \frac{\text{Bulk Density (g/cc)}}{\text{Bubble Point (psi)}}$$

The process of the present invention produces porous PTFE articles with coarseness factors far in excess of the values stated in the examples of U.S. Pat. No. 4,482,516.

SUMMARY OF THE INVENTION

In the present invention a blend of resin composition and blending technique is optimized to provide a desired balance of node size and fibril length with the additional property of thermal stability in the resulting stretched material.

The stretched blend can be described as a polytetrafluoroethylene porous material having a microstructure of nodes interconnected by fibrils; said material comprising a blend of two different polytetrafluoroethylenes, one polytetrafluoroethylene being a homopolymer of tetrafluoroethylene and the other polytetrafluoroethylene being a modified polymer of tetrafluoroethylene.

By the term "modified" is meant that only a small amount of comonomer is present; namely, an amount that is not great enough to cause the PTFE polymer to become melt processible. In other words, the copolymer retains the non-melt processible characteristics of PTFE homopolymer.

DETAILED DESCRIPTION OF THE INVENTION

Figure 1A:
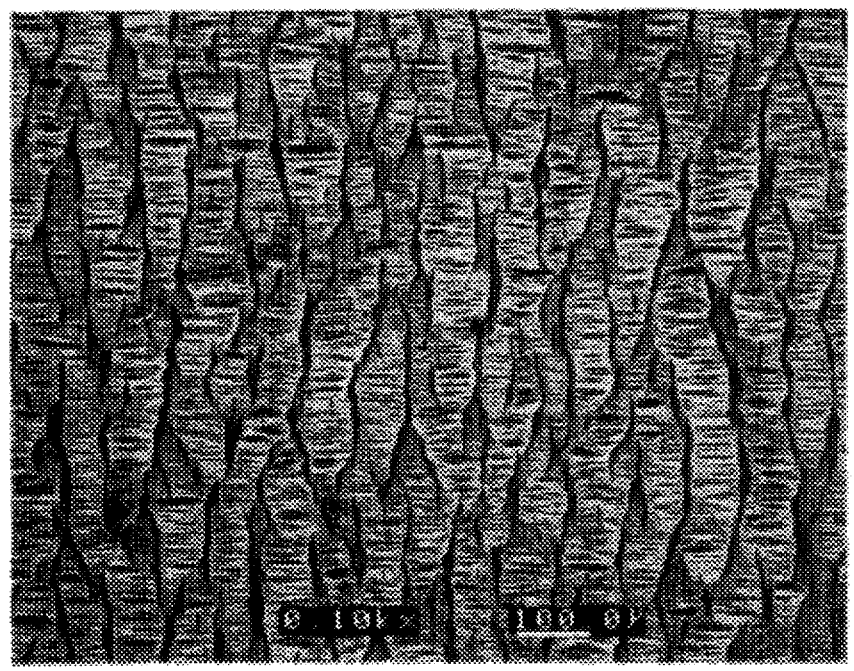
FIGS. 1a and 1b are photomicrographs of the stretched material in film form of Example 1 taken in FIG. 1a of the top of the film and in FIG. 1b of the edge in cross-section.

A wide variety of polytetrafluoroethylene (PTFE) polymers are commercially available. Those identified in the art as fine powders are especially useful in stretching to make porous stretched PTFE.

The present invention produces resins which are stretched to form an open microstructure having large nodes and long fibrils and good high temperature structural stability by employing two PTFE polymers; one polymer is a PTFE homopolymer and one is a modified homopolymer. The amounts employed can range from 10–90 weight percent homopolymer and 90–10 weight percent modified homopolymer. A preferred range is 10–50, or 20–50 weight percent homopolymer, with the rest being modified homopolymer.

The homopolymer is one which is more easily stretched at low expansion rates than the modified polymer.

The polymers are obtained or are prepared in aqueous dispersion form, and are blended by mixing the dispersions together and coagulating and precipitating the solids. The dried solids are then lubricated, paste extruded, calendered thermally dried, and then are rapidly stretched to obtain a very open microstructure of large nodes with long fibrils, which is uniform and structurally stable at temperatures above the homopolymer melt. The fibrils can have average lengths of 25 micrometers or more, preferably 100 micrometers or more.

When different PTFE polymers are combined in the dispersion form, intimate blending occurs on the primary particle scale (on the order of 0.23 μ diameter) as opposed to dry blending of fine powder agglomerates (which are on the order of 400–500 μ diameter). Blending of the larger agglomerates results in gross non-uniformities in the expanded final product, whereas the dispersion blended polymers yield highly uniform expanded products.

In one embodiment, when a high molecular weight PTFE homopolymer is blended with a lower molecular weight modified polymer, a strong synergy between expanded microstructure and high temperature structural stability is created. The modified polymer component of the blend contributes little to the formation of fibrils when expanded. This greatly reduces the number of initiation sites for fibril formation and so produces a microstructure comprised of large nodes and long fibrils. The fibrils that are formed are comprised almost entirely of the high molecular weight homopolymer component, the low molecular weight modified polymer resides primarily in the nodes. When an expanded PTFE article is heated to the point where it structurally decomposes, it is the breakage of the fibrils that leads to failure. In the present invention the fibrils are composed of high molecular weight polymer and as a result the entire article has structural stability at a much higher temperature. The unique high temperature structural stability of the invention allows the stretched material of the resin blends to be processed at high temperatures, well above the melt point of PTFE. Blends of different molecular weight homopolymer PTFEs show no such synergy and so blends this type are of reduced utility.

One of the major component PTFE resins used in the blend to be stretched is PTFE homopolymer, and another major component is the "modified" homopolymer. The comonomer units are supplied by fluorinated ethylenically unsaturated comonomers. The preferred comonomer units are provided by hexafluoropropylene or perfluoro(alkyl vinyl ether), usually perfluoro(propyl vinyl ether). As stated above, the amount of comonomer units will be such that the copolymer retains the non-melt processibility characteristic of the homopolymer. Small concentrations of modifying agent present in the blends of this invention can be detected and quantified by comparing specific absorbance band intensities from Infrared spectra of the resin blend. An FTIR method is described in U.S. Pat. No. 4,391,940 for quantitation of trifluorochloroethylene (CTFE), perfluoropropene (HFP), and perfluoro(Propylvinylether) (PPVE) in tetrafluoroethylene based fluoropolymers.

The PTFE resin components are combined in dispersion form to achieve intimate mixing of primary particles. The blend is then coagulated and dried. A suitable lubricant liquid is distributed onto the fine powder and blended in. A preform is made and the desired preform shape is paste extruded. The extrudate may be calendered, then dried to remove the lubricant. The resulting shape can be stretched in the longitudinal or transverse direction or both to give the desired porosity and microstructure. Finally, the stretched PTFE can be heated to a temperature above the crystalline melt point to thermally lock the structure. The desired shape can be in the form of a tape, filament, film, rod, tube or the like.

The stretched PTFE has a relaxation time of 200 seconds or more and a coarseness factor of 0.6 (g/cc)/psi or greater. Molecular weight is determined by first obtaining the standard specific gravity (SSG) of the PTFE resin, and then following an equation according to Doban, et al., in their paper "The Molecular Weight of PTFE", presented at the American Chemical Society meeting at Atlantic City, N.J., Sep. 18, 1958.

The equation is:

$$Mn = 0.597 \left[ \log \frac{0.157}{2.306 - SSG} \right]^{-1} \times 10^6$$

Mn = number average molecular weight

SSG is determined by ASTM D-4894 and D-4895 except that the samples were not conditioned for humidity and the pressure rise was increased more quickly.

EXAMPLE 1

A PTFE homopolymer, in dispersion form was obtained from duPont. The tetrafluoroethylene was polymerized according to the teachings of Malhotra in U.S. Pat. No. 4,576,869. Standard specific gravity was approximately 2.158 g/cc which corresponds to an average molecular weight of 23,000,000. This homopolymer dispersion was combined with the dispersion form of CD090 (a modified PTFE produced by ICI) in a ratio of 30% high molecular weight PTFE homopolymer and 70% CD090 based on polymer solids. The CD090 had a molecular weight of 4,675,000 (SSG of 2.189 g/cc.) and was made mostly of recurring units of tetrafluoroethylene with a very small amount of units of fluorinated comonomers. A total of 30 lbs. of polymer was prepared at a solids concentration of 15%. The mixture was coagulated by agitation using a motor driven impeller. After coagulation, the blended fine powder was separated from the bulk water by filtration and dried in an air oven to remove any remaining water. A 15.0 pound aliquot of this powder was then combined with 3.12 pounds of a substantially aliphatic hydrocarbon lubricant with a boiling point range of 170° C. to 210° C. After blending, the lubricated powder was compressed into a cylindrical pellet 4 inches in diameter. The pellet was extruded through a rectangular orifice die to give a tape approximately 6.0 inches wide and 0.027 inch thick. This tape was compressed between rolls to give a final thickness of 0.00385 inch. The tape was dried on heated rolls to remove the lubricant and then stretched at a ratio of 3.95:1. Finally, the tape was passed over hot rolls maintained at a temperature well above the crystalline melt point of PTFE to sinter or thermally lock the PTFE structure. The resulting tape was extremely uniform with very large nodes and long fibrils. The nodes were columnar in shape and were continuous across the full thickness of the tape.

Ethanol Bubble Point (EBP) was measured using ASTM F316-80. Bulk density was determined by cutting and weighing a square of the tape and measuring length, width, and thickness. Average EBP was 0.30 psi, bulk density was 0.473 g/cc. The coarseness factor was calculated according to U.S. Pat. No. 4,482,516 and was 1.58 (g/cc)/psi.

The tape is useful in a variety of applications, e.g. to tape wrap electrical cable as the dielectric. It is crush resistant because of the columnar node configuration. There is structural stability at high temperature. The stretched material is useful as a medical implantable device, cable insulation, filtration membrane, or gasketing material.

Figure 1B:
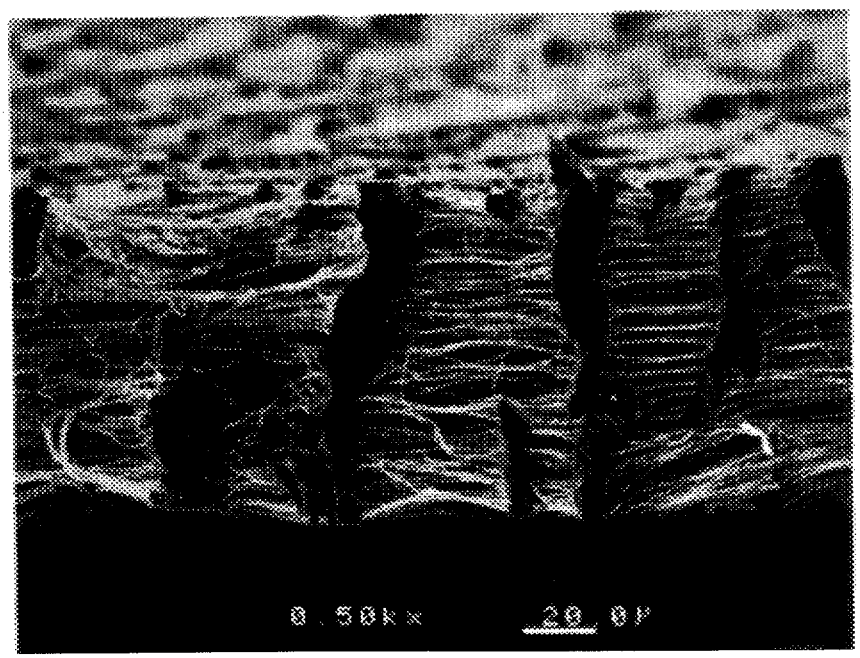

As seen in FIGS. 1a and 1b, the stretched tape comprises generally aligned columns of nodes (the long vertically aligned dark areas of the SEMs) having a rope or ladder like series of fibrils (the horizontally dispersed white threads of the SEMs) connecting the nodes at about a right angle from the general direction of the nodes.

EXAMPLE 2

PTFE homopolymer used was the homopolymer used in Example 1. This homopolymer dispersion was combined with the dispersion form of CD090 in a ratio of 30% PTFE homopolymer and 70% CD090 based on polymer solids. The dispersion blend (about 15% solids) was coagulated by mechanical agitation. The resulting powder was dried in an air oven at 50° C. for several days. A 113.4 g aliquot of this resin blend was combined with 32.5 ml of lubricant used in Example 1. The resin/lube mixture was combined by tumbling and then pelletized into a 1.0 inch diameter cylindrical preform fitted with a 0.100 inch diameter orifice die. The preform was extruded and the resulting extrudate was dried at 230° C. for 25 minutes. A 2 inch selection of extrudate was expanded 25:1 at 300° C. and at an expansion rate of 100% per second over the original length. The expanded beading had extremely long fibrils and large nodes which spanned the entire cross-section of the bead. The separation of nodes was large enough and complete enough to permit the sectioning of fibrils. Segments of fibrils were combined to give a total sample size of 2.8 mg. A 12.2 mg. sample of a representative node was also collected. These samples were analyzed by differential scanning calorimetry. Samples were scanned at 10° C. per minute from −10° C. to +400° C. for the first heat; then scanned from +400° C. to −10° C. at 10° C. per minute for the cool.

Recrystallization energies (discussed in Suwa, JAPS 17, pp. 3253-3257 (1973)) for the various samples and standards are shown below:

| SAMPLES | RECRYSTALIZATION ENERGY (Cal/g) |
|---|---|
| CD090 | 8.18 |
| High MW Homopolymer | 5.95 |
| Blend Node Component | 7.66 |
| Blend Fibril Component | 6.17 |

Measurement error for recrystalization energy is +0.3–0.5 cal/g.

Within experimental error the recrystalization energies indicate that the fibrils are composed of almost entirely the high molecular weight homopolymer component of the blend. The recrystalization energy of the node component indicates a component ratio of 77% CD090/23% high MW homopolymer. This suggests that the high MW homopolymer in the nodes has been depleted as a function of expansion, the high MW homopolymer being selectively pulled out of the bulk to form the fibrils.

EXAMPLE 3

PTFE homopolymer dispersion, (the same as used in Example 1) was combined in varying ratios with the dispersion form of CD090 as set forth in Example 1. The blended dispersions were diluted with deionized water to give 15% polymer solids. Each mixture was coagulated by agitation with a motorized impeller. Each coagulated powder was dewatered and dried in an air oven at 150° C. for 24 hours. A 113.4 g aliquot of each blended powder was mixed with 32.5 ml of lubricant used in Example 1 and tumbled. Each lubricated powder was preformed at room temperature in a 1.00 inch diameter extruder barrel fitted with a 0.100 inch diameter orifice die. The preforms were extruded at a constant ram rate of 20 inches/min. into a beading. The beading was dried at 230° C. for 25 minutes to remove the lubricant. Small lengths of beading were cut and batch expanded at 300° C. with an expansion ratio of 16:1 and an expansion rate of 1000%/sec. The beadings were tested as described below.

Comparison Example A

PTFE homopolymer (as used in Example 1) in dispersion form was combined as in Example 1 in varying ratios with the dispersion form of CD1. CD1 is a low molecular weight PTFE homopolymer produced by ICI with a standard specific gravity of 2.191 g/cc and an approximate molecular weight of 4,400,000 (by Doban). These blends were coagulated dewatered and dried as in Example 3. The resulting powders were processed into bead, stretched and expanded, as in Example 3. The beads were tested as described below.

Comparison Testing of Samples of Example 3 and Comparison Example A

Sections of expanded beads were examined by scanning electron microscopy and fibril lengths were measured directly from the micrographs using a steel rule by dividing the SEM into six sections and taking one measurement in each section of a fibril selected to provide a representative measurement of fibril length in that section. The average of these measurements is a rough measure of the coarseness of the microstructure. These results are recorded in Table 2.

Figure 2:
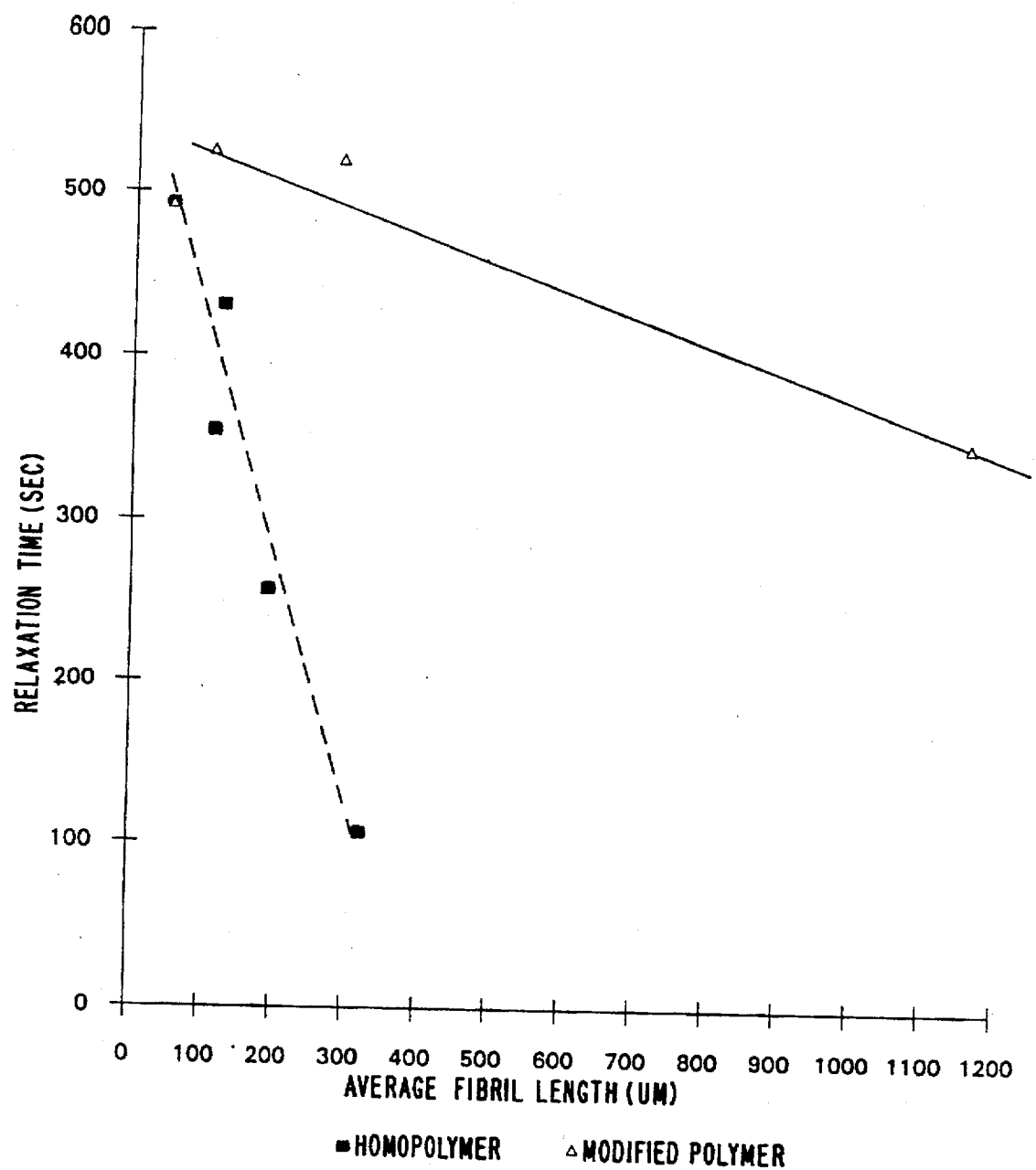
FIG. 2 is a graph of product high temperature structural stability as a function of microstructure of the stretched material.

Sections of expanded beads of Example 3 and Comparison Example A were also tested for structural stability at high temperature (Relaxation Time). Expanded bead specimens from each resin blend were restrained and placed in an air oven at 390° C. The time (in seconds) required for the specimen to fail structurally (break) was recorded as "Relaxation Time." These results are recorded in Table 2 and are graphically represented in FIG. 2.

TABLE 2

| BLEND COMPOSITION | | | PROPERTIES | |
|---|---|---|---|---|
| % High MW Homopolymer | % CD090 | % CD1 | Fibril Length (um) | Relaxation Time (sec) |
| 100 | | 0 | 50 | 493 |
| 60 | | 40 | 124 | 431 |
| 40 | | 60 | 114 | 354 |
| 20 | | 80 | 192 | 257 |
| 0 | | 100 | 322 | 107 |
| 100 | 0 | | 50 | 493 |
| 60 | 40 | | 106 | 525 |
| 40 | 60 | | 286 | 521 |
| 20 | 80 | | 1163 | 349 |
| 0 | 100 | | Would Not Expand Under These Conditions | |

It is seen that for the samples of Example 3, the blend ratio of modified polymer to homopolymer has a large effect on fibril length but little effect on relaxation time. This indicates that the homopolymer/modified polymer PTFE blends of the present invention can be used to produce stretched PTFE articles with very large nodes and long fibrils and can be processed at temperatures well above the crystalline melt point of PTFE without loss of structural integrity.

For the samples of Comparison A, the homopolymer/homopolymer PTFE blend shows a linear response between fibril length and relaxation time. As blend ratio is varied, a small change is observed in fibril length with a very large corresponding change in relaxation time. Resin blends of this type have little utility as a means of producing large node, long fibril structures because of their lack of high temperature structural stability. A coarse microstructure article made from this type of resin cannot be sintered to stabilize the microstructure without significant loss of structural integrity.

I claim:

1. A stretched porous polytetrafluoroethylene having a microstructure of nodes interconnected by fibrils in which the material comprises a mixture of two different polymers, one polymer being polytetrafluoroethylene homopolymer and the other polymer being a non-resilient modified polytetrafluoroethylene polymer in which the polymer contains units of a comonomer in an amount insufficient to cause the polymer to become melt-processible.

2. A material of claim 1 in which the weight ratio of the polytetrafluoroethylene homopolymer to the modified polytetrafluoroethylene polymer is between 90/10 and 10/90.

3. A material of claim 1 in which the weight ratio of the polytetrafluoroethylene homopolymer to the modified polytetrafluoroethylene polymer is between 50/50 and 20/80.

4. The material of claims 1, 2, or 3 in the form of a tape filament, film, rod, or tube.

5. A material of claim 1 in which the homopolymer is present predominantly in the fibrils, and the modified polytetrafluoroethylene is present predominantly in the nodes.

6. A material of claim 1 in which the relaxation time of the materials is greater than 200 seconds.

7. A material of claim 1 in which the average fibril length is greater than 100 μm.

8. A material of claim 1 in which the coarseness factor is greater than 0.60 (g/cc)/psi.

9. Process for preparing a porous polytetrafluoroethylene material which comprises the steps in sequence of:

(a) forming an aqueous dispersion of a polytetrafluoroethylene homopolymer and a non-resilient modified polytetrafluoroethylene polymer in which the modified polymer contains units of a comonomer in an amount insufficient to cause the polymer to become melt-processible;

(b) coagulating the solids from the dispersion;

(c) lubricating and paste extruding the coagulated material; and (d) stretching the material.

10. The process of claim 9 wherein the stretched mixture is then heat-treated.

* * * * *